(12) United States Patent
Kioua et al.

(10) Patent No.: US 9,341,083 B2
(45) Date of Patent: May 17, 2016

(54) TURBOJET ENGINE NACELLE WITH DOWNSTREAM SECTION

(71) Applicant: AIRCELLE, Gonfreville l'Orcher (FR)

(72) Inventors: Hazem Kioua, Saint Jouin Bruneval (FR); Vincent Peyron, Le Havre (FR); Laurent Georges Valleroy, Le Havre (FR)

(73) Assignee: AIRCELLE, Gonfreville l'Orcher ( * ) Notice: Subject to any disclaimer, the term of this patent is extended or adjusted under 35 U.S.C. 154(b) by 0 days.

(21) Appl. No.: 14/524,099

(22) Filed: Oct. 27, 2014

(65) Prior Publication Data

US 2015/0300204 A1     Oct. 22, 2015

Related U.S. Application Data

(63) Continuation of application No. PCT/FR2013/050938, filed on Apr. 26, 2013.

(30) Foreign Application Priority Data

Apr. 27, 2012   (FR) ...................................... 12 53902

(51) Int. Cl.
*B64D 29/06* (2006.01)
*F01D 25/24* (2006.01)
*F02K 1/72* (2006.01)
*B64D 33/04* (2006.01)

(52) U.S. Cl.
CPC ............... *F01D 25/24* (2013.01); *B64D 29/06* (2013.01); *F02K 1/72* (2013.01); *B64D 33/04* (2013.01); *F05D 2220/30* (2013.01)

(58) Field of Classification Search
CPC ....... F01D 25/24; F01D 25/243; F01D 25/28; F05D 2220/30; B64D 29/06; F02K 1/72
See application file for complete search history.

(56) References Cited

U.S. PATENT DOCUMENTS

| | | | | |
|---|---|---|---|---|
| 4,442,987 A | * | 4/1984 | Legrand ................. | B64D 29/08 239/265.25 |
| 8,328,132 B2 | * | 12/2012 | Marche .................. | B64D 27/20 244/53 R |
| 2003/0025033 A1 | * | 2/2003 | Levert .................... | B64D 27/26 244/54 |
| 2010/0107599 A1 | * | 5/2010 | Vauchel ................. | B64D 29/08 60/226.2 |
| 2011/0023450 A1 | | 2/2011 | Stuart et al. | |
| 2011/0318173 A1 | | 12/2011 | Ramlaoui et al. | |

FOREIGN PATENT DOCUMENTS

| | | |
|---|---|---|
| EP | 2 221 249 A2 | 8/2010 |
| FR | 2 560 854 A1 | 9/1985 |

(Continued)

OTHER PUBLICATIONS

International Search Report issued Jul. 4, 2013 in International Application No. PCT/FR2013/050938.

*Primary Examiner* — Dwayne J White
*Assistant Examiner* — Kayla McCaffrey
(74) *Attorney, Agent, or Firm* — Burris Law, PLLC

(57) ABSTRACT

A turbofan engine nacelle has a downstream section which includes at least one front frame. The front frame is attached to a stationary portion of the nacelle, and the downstream section is provided with at least one rail or slide which extends in a longitudinal direction of the nacelle and is capable of engaging with at least one corresponding slide or rail of an attachment pylon of the turbofan engine. The front frame is connected to the rail or slide of the downstream section by means of at least one swiveled connecting rod.

9 Claims, 3 Drawing Sheets

(56) References Cited

FOREIGN PATENT DOCUMENTS

| | | | |
|---|---|---|---|
| FR | 2 755 942 | A1 | 5/1998 |
| FR | 2 855 494 | A1 | 12/2004 |
| FR | 2 892 706 | A1 | 5/2007 |
| FR | 2 916 426 | A1 | 11/2008 |
| FR | 2 948 635 | A1 | 2/2011 |
| FR | 2 948 636 | A1 | 2/2011 |

* cited by examiner

TURBOJET ENGINE NACELLE WITH DOWNSTREAM SECTION

CROSS-REFERENCE TO RELATED APPLICATIONS

This application is a continuation of International Application No. PCT/FR2013/050938, filed on Apr. 26, 2013, which claims the benefit of FR 12/53902, filed on Apr. 27, 2012. The disclosures of the above applications are incorporated herein by reference.

FIELD

The present disclosure relates to a connecting device between a front frame of the thrust reverser of a turbojet engine nacelle and a pylon or attachment mast of said turbojet engine.

BACKGROUND

The statements in this section merely provide background information related to the present disclosure and may not constitute prior art.

As this is known per se, an aircraft propulsion unit conventionally comprises a turbojet engine housed within a nacelle.

The nacelle generally has a tubular structure comprising an air intake upstream of the turbojet engine, a middle section intended to surround a fan of the turbojet engine and its casing, a downstream section intended to surround the combustion chamber of the turbojet engine and casing, if appropriate, thrust reversal means. It may be terminated by an ejection nozzle the outlet of which is located downstream of the turbojet engine.

The assembly is fastened to a fixed structure of the aircraft, in particular under a wing or a fuselage, by means by means of a pylon or an attachment mast of the turbojet engine fastened to the latter in its front and rear portion by suspensions and which also provides the holding the nacelle.

There are numerous connection systems between the turbojet engine and the pylon so as to take the best the thrust forces of said turbojet engine. Documents FR 2 948 636, FR 2 948 635, EP 2 221 249, FR 2 892 706, FR 2 855 494, FR 2 755 942 are particularly cited.

Modern nacelles are intended to house a double flow turbojet engine able to generate, by means of the blades of the rotating fan, a hot air flow (also known as primary flow) coming from the combustion chamber of the turbojet engine, and a cold air flow (secondary flow) that flows outside the turbojet engine through an annular passage, also called stream, formed between a fairing of the turbojet engine (fixed inner structure or IFS being able to belong to the nacelle) and an inner wall of an outer structure of the downstream section of the nacelle (OFS or outer fixed structure). The two air flows are ejected from the turbojet engine to the back of the nacelle.

As mentioned previously, the outer fixed structure can house a thrust reversal device. The role of a thrust reverser during the landing of an aircraft is to improve the braking capacity thereof by redirecting forward at least one portion of the thrust generated by the turbojet engine. In this phase, the inverter blocks the stream of the cold flow and directs the latter toward the front of the nacelle, thereby generating a counter-thrust that is added to the braking of the wheels of the aircraft.

The means implemented to achieve this cold flow reorientation vary depending on the thrust-reverser type. However, in all cases, the structure of a thrust-reverser comprises movable cowls displaceable between, on the one hand, a deployed position in which they open a passage within the nacelle intended for the diverted flow, and on the other hand, a retracted position in which they close this passage and provide the inner and outer aerodynamic continuity of the nacelle.

These cowls can directly fulfill a function of deflection or simply actuation of other diverting means (inner doors).

In the case of a thrust reverser with grids, also known under the name of cascade-type thrust reverser, the reorientation of the air flow is carried out by diverting grids, the cowl having only one simple sliding function aiming at uncovering or covering these grids. Complementary blocker doors, also called blocking flaps, activated by the sliding of the cowling, allow at least one partial obstruction of the stream downstream of grids so as to optimize the reorientation of the cold flow.

In order to support the reversal movable cowls and to connect the downstream section to the rest of the nacelle, and in particular to the middle section by means of the fan casing, this one comprises fixed elements and in particular longitudinal beams connected upstream to a substantially annular assembly called front frame, formed in one or more portion(s) between said longitudinal beams, and intended to be fixed to the periphery of the downstream edge of the fan casing of the engine.

This front frame is connected to the fan casing by fixing means generally of the knife/groove type comprising a substantially annular flange, integral with the front frame and cooperating with a J or V-shaped groove, commonly called J-Ring.

The upper longitudinal beams are also connected to the pylon.

This structure can also be applied to a nacelle called smooth nacelle, wherein the downstream section constitutes an outer fairing of the nacelle and is not equipped with a thrust reversal device sliding along beams.

Thus, the downstream section is fastened, on the one hand, to the turbo jet engine by means of the fan casing, and, on the other hand, to the pylon.

In the case of an architecture of a conventional nacelle called nacelle with duct in C or in D (C-duct or D-duct), the downstream section has half-cowls with side opening (at the end of maintenance) by pivoting the upper beams around a substantially longitudinal axis of the nacelle extending along the fastening pylon of the turbojet engine.

There is also another type of nacelle architecture, more recent, called duct in O (O-duct) and particularly described in the document FR 2 916 426.

In this O-duct architecture, the downstream section does not comprise two half-cowls with side opening anymore, but a single-piece cowl substantially peripheral, and which extends from one side to the other of the pylon.

For maintenance purposes, such a cowl can't be opened by pivoting and is movably mounted by sliding towards the back of the nacelle, along the rails or slides disposed on either side of the pylon.

For classical nacelle architecture in C or in D, the nacelle/pylon connections have no particular difficulty and are well known. For the downstream section, the pivoting mounting of the cowls on the pylon, allows particularly good accommodation of the relative displacements and other mounting sets of the assembly.

This does not hold true for an O architecture in which these adjustment means no longer exist. An example of a connection system for an O-duct architecture is described in US 2011/0023450 document.

The rails and slide of the downstream structure on the pylon are also structural and must thus provide the holding of the assembly, the resumption of the forces and their transmission to the pylon.

Such an architecture and connection lead to many implementation difficulties.

More specifically, as mentioned above, a downstream section of the nacelle of the O-duct type is attached, on the one hand, to the turbojet engine by a front frame connected to the fan casing (interface called A2), and on the other hand, to the pylon by means of its slide rails.

These rails are oriented substantially at 90° with respect to the interface A2 of connection to the fan casing.

This double attachment generates a hyperstatic assembly and a major difficulty is to accommodate, between the turbojet engine and the pylon, the assembly tolerances, the related displacements under loads as well as related displacements due to the thermal expansion of the turbojet engine, among others.

Currently, these related displacements must be taken up by the flexibility of the fixed structure of the downstream section. This requires an adaptation of the materials used.

The existing solutions that address this problem of nacelle/pylon connection regard the conventional nacelles with structures in C or in D, and are not adapted to a nacelle with an O structure having a direct connection to the pylon (sliding O nacelle). Thus, there is a need for a connection which allows solving this problem.

SUMMARY

The present disclosure provides a turbojet engine nacelle having a downstream section comprising at least one front frame intended to be fastened to a fixed portion of the nacelle, said downstream section being equipped with at least one rail or slide extending in a substantially longitudinal direction of the nacelle and capable of cooperating with at least one corresponding slide or rail of a fastening pylon of the turbojet engine, characterized in that the front frame is connected to the rail or to the slide of the downstream section by means of at least one swiveled connecting rod.

Thus, by providing a swiveled connecting rod between the front frame, rigidly fastened to the turbojet engine by means of the fan casing, and the pylon fastening system of the back section, the related displacements between the turbojet engine and the pylon are no longer taken over by flexible deformation of the fixed structure of the downstream section but by said flexible connection.

According to an advantageous form, the downstream section comprises a rear frame. Such a rear frame can strengthen the structural holding of the assembly of the downstream section and be used to support at least partly inner elements of the nacelle such as diverting grids in the case of a downstream section equipped with a thrust reversal device or even actuating means.

Advantageously, the rear frame is fastened to the rail or to the slide by means of at least one swiveled connection.

In one form, the pivoted connecting joint(s) are oriented in a plane substantially perpendicular to the pylon. Thus, only the deformations in the longitudinal (X) and transverse (Y) directions of the nacelle are absorbed. The forces in the direction of the pylon (Z), generally corresponding to the thrust forces are thus well taken and transmitted to the pylon.

According to another form, the swiveled connecting rod is mainly oriented substantially in a longitudinal direction of the nacelle.

In still another form, the swiveled connecting rod is mainly oriented in a transverse direction of the nacelle.

Advantageously, the swiveled connection is a double swivel connection.

According to a particular form, the downstream section is equipped with a thrust reversal device.

Advantageously, this is a nacelle of the type called O-duct type. Although particularly dedicated to nacelles of O-duct type such as presented above, the present disclosure is of course applicable to nacelles of C-duct type wherein the half-cowls are slidably mounted along an upper beam or the pylon, and along a lower beam.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
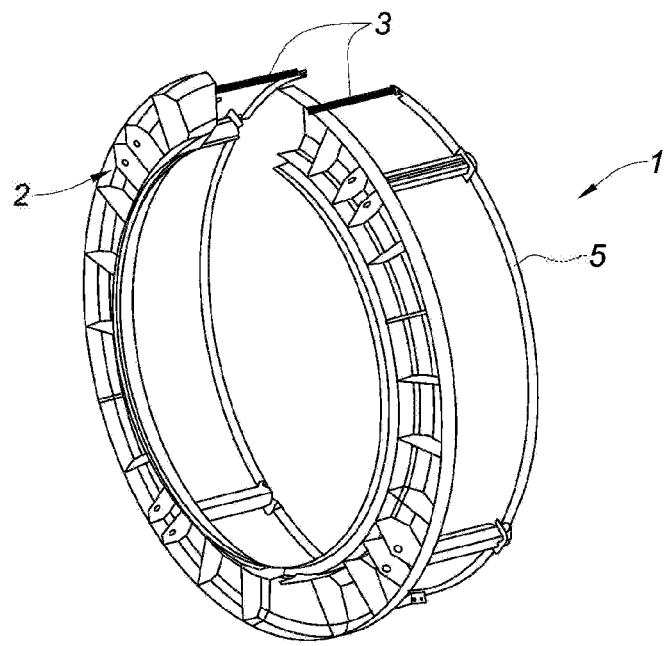
FIG. 1 is a schematic representation of the main elements of a fixed structure of rear section of O-type section of a nacelle of a turbojet engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As described above, a fixed structure 1 of rear section of turbojet engine 10 nacelle with O-duct type comprises a front frame 2 substantially peripheral intended to be fastened to a casing 11 of a turbojet engine fan and having an interruption in the upper portion intended for the passage of a fastening pylon 20 of said turbojet engine 10.

The fixed structure 1 also comprises a pair of side guide rails 3, fastened to the front frame 2 and extending in a substantially longitudinal direction of the nacelle on each side of the interruption of the front frame 2. These guide rails 3 are intended to cooperate with the slides 3' corresponding to the pylon 20 so as to allow the backward translation of the rear section, as mentioned in the introduction.

Of course, it is also possible to have the reverse disposition, namely the guide rails mounted on the pylon and slides fastened to the front frame 2.

The structure 1 is intended to support a thrust reversal device with grids and further comprises a rear frame 5 intended to support, with the front frame 2, an assembly of diverting grids.

According to the prior art, the guide rails 3 are rigidly fastened to the front frame, and integral with the latter. The result is a structure with a high degree of static indeterminacy.

The front frame 2 being rigidly connected to the turbojet engine 10, and the rails 3 being rigidly connected to the pylon, this structure is subjected to significant deformation constraints resulting from related displacements between these two structures (turbojet engine and pylon) to which it is fastened.

These deformations must be absorbed by the same flexibility of the used materials to manufacture said elements of the fixed structure 1. This obviously limits the choice of the usable materials.

Figure 2:
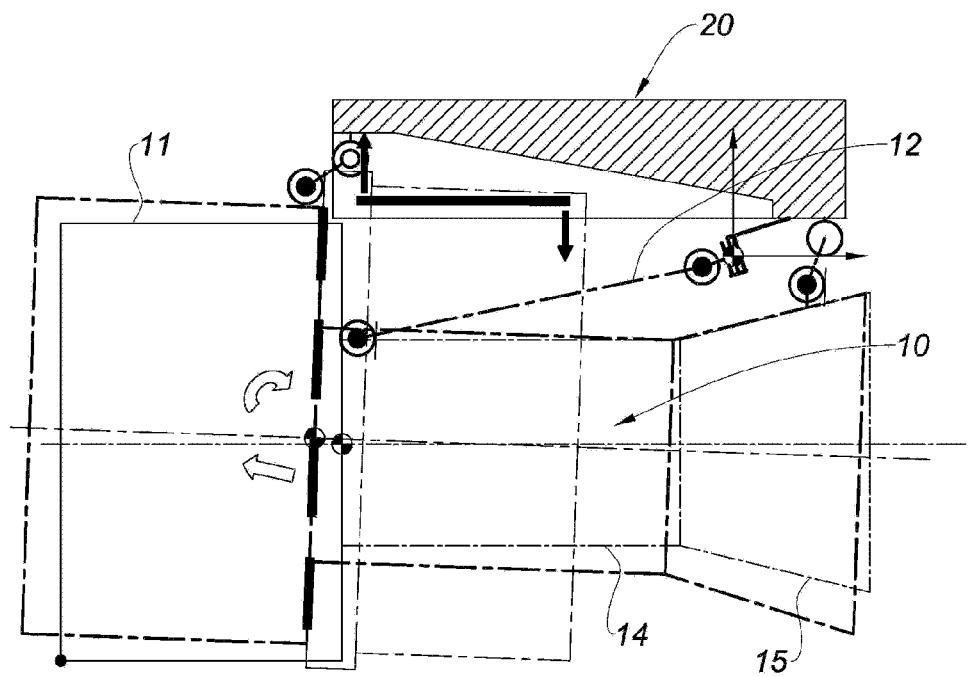
FIG. 2 is a schematic representation of various forces to which the elements of the fixed structure of FIG. 1 may be subjected.

FIG. 2 illustrates some of these deformations. In particular, it was estimated that the thermal expansion of the connecting rods of thrust resumption 12 between the pylon 20 and the turbojet engine 10 could reach about 5 mm.

The casing 14 of the combustion chamber and the casing 15 of primary nozzle of the turbojet engine 10 can undergo an axial expansion of up to 10 mm.

The casing 15 of the primary nozzle of the turbojet engine 10 can further undergo an own expansion of about 5 mm.

The fixed structure 1 being rigidly fixed to the pylon 20 and to the turbojet engine 10, it undergoes a corresponding inclination to the undergone deformations, and which results in particular in a raising in the nose of the turbojet engine as well as a slight advance of the latter.

Furthermore, already concerning a highly requested environment, such deformations still add local constraints.

Figure 3:
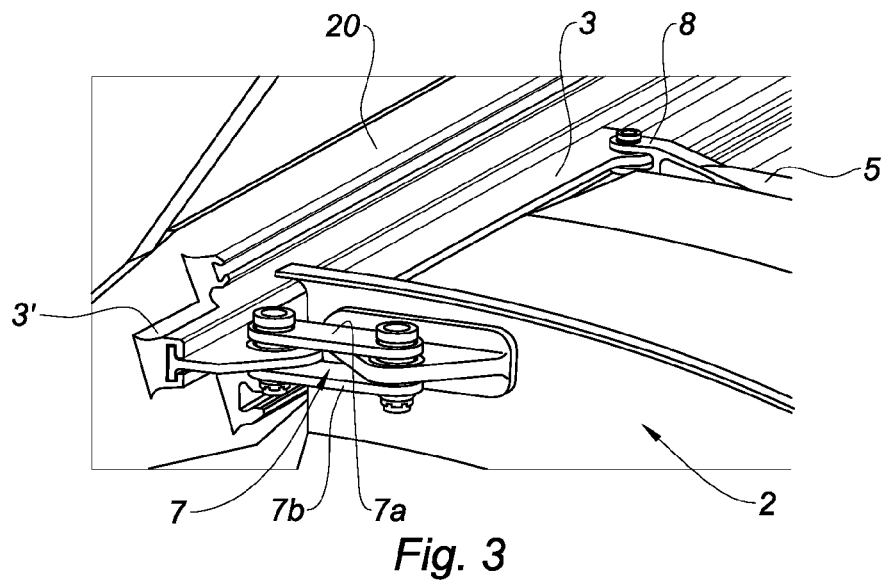
FIGS. 3 and 4 are partial schematic views of a fixed structure comprising a connection according to the present disclosure.
Figure 4:
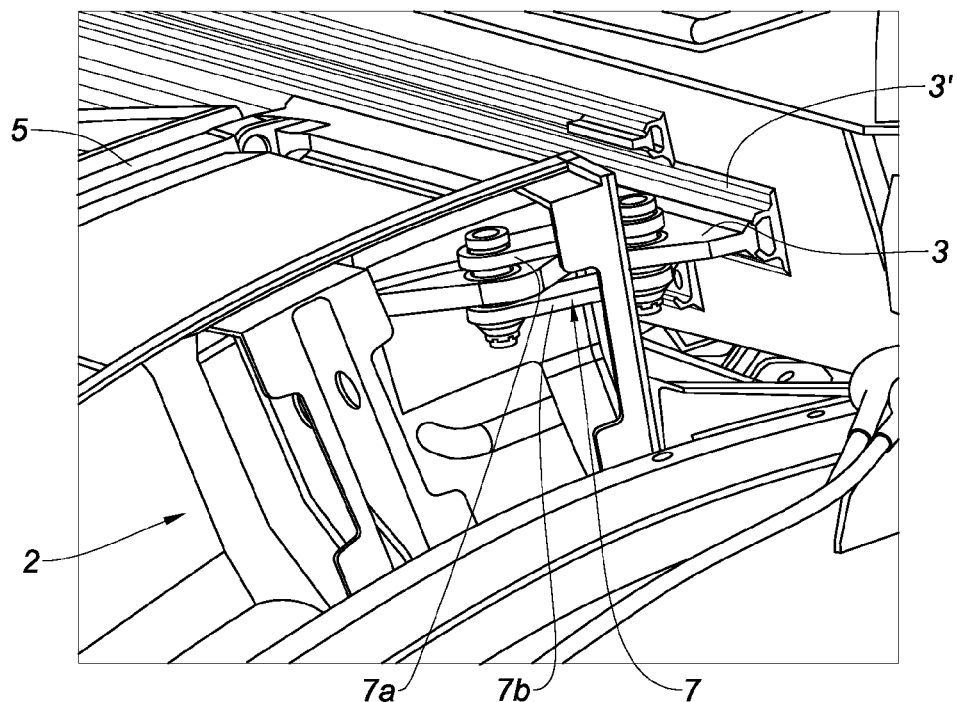

In accordance with the present disclosure, and as shown in FIGS. 3 and 4, the front frame 2 is connected to the rail 3 or to the slide of the downstream section by means of at least one swiveled connection 7.

More specifically, the front frame 2 is fastened to the guide rail 3 by means of a double swiveled connecting rod 7a, 7b, oriented in a substantially transverse direction of the nacelle, substantially perpendicular to the pylon 20.

It is also possible to orient the connection in a longitudinal direction, depending on the forces to be resumed.

Note also the presence of a swiveled connection 8 between the rear frame 5 and the guide rail 3. More specifically, the swiveled connection 8 is a simple connection having a swiveled fork. This swiveled connection of the rear frame is not present in the form of FIG. 4.

Figure 5:
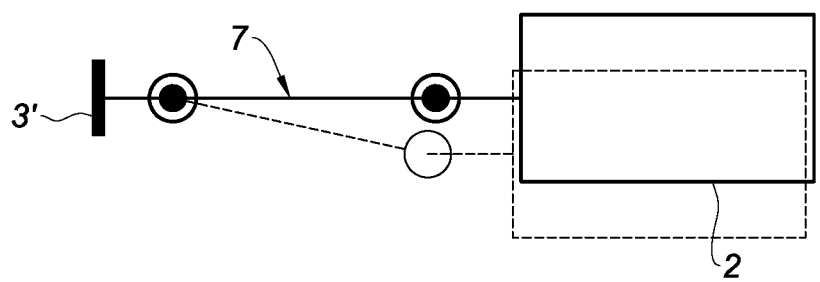
FIGS. 5 and 6 are schematic representations of alternative forms of the swiveled connecting rod.

FIG. 5 is a schematic representation of the displacement of the swiveled connecting rod as shown in the previous example. The rotation of the swiveled connecting rod and of the slide is formed by the T-profile of the rail 3'.

Figure 6:
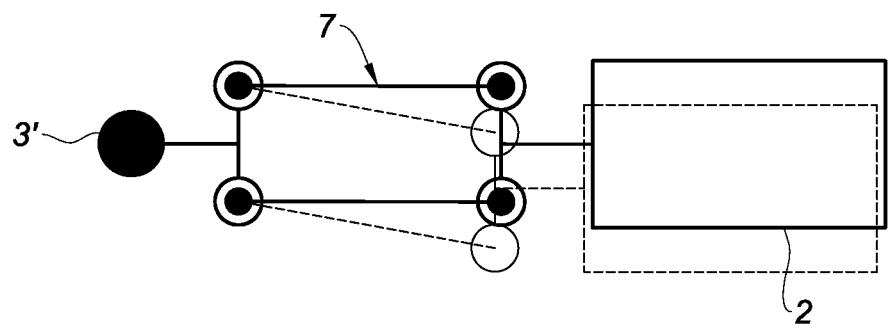

FIG. 6 shows an alternative implementation using a round rail profile instead of a T-rail profile, this in order to avoid excessive constraints due to the resumption of the moments in the rail profile. The swiveled connecting rod can then be replaced by two swiveled connecting rods forming a deformable parallelogram, which can force the slide to remain substantially parallel to the end 12 hours of the front frame and so to control its orientation.

Although the present disclosure has been described with a particular form, it is obvious that it is in no way limited and that it comprises all the technical equivalents of the means described as well as their combinations if these enter the scope of the present disclosure.

What is claimed is:

1. A turbojet engine nacelle having a middle section comprising a fan case of a turbojet engine, and a downstream section comprising at least one front frame, wherein the downstream section is rigidly fixed to the middle section by the fan case and flexibly connected to a fastening pylon of said turbo jet engine by at least one swiveled connecting rod, said downstream section being equipped with at least one rail or slide extending in a substantially longitudinal direction of the nacelle and configured to cooperate with at least one corresponding slide or rail of a fastening pylon of the turbojet engine, wherein the at least one rail or slide of the downstream section is connected to the at least one swiveled connecting rod, and a flange of said at least one swiveled connecting rod being directly attached on a periphery of the front frame.

2. The turbojet engine nacelle according to claim 1, wherein the downstream section further comprises a rear frame.

3. The turbojet engine nacelle according to claim 2, wherein the rear frame is fastened to the rail or to the slide by means of at least one swiveled connection.

4. The turbojet engine nacelle according to claim 1, wherein said at least one swiveled connecting rod is oriented according to a plane substantially perpendicular to the pylon.

5. The turbojet engine nacelle according to claim 4, wherein said at least one swiveled connecting rod is mainly oriented substantially in a longitudinal direction of the nacelle.

6. The turbojet engine nacelle according to claim 4, wherein said at least one swiveled connecting rod is mainly oriented in a transverse direction of the nacelle.

7. The turbojet engine nacelle according to claim 1, wherein said at least one swiveled connecting rod is a double swivel connection.

8. The turbojet engine nacelle according to claim 1, wherein the downstream section is equipped with a thrust reversal device.

9. The turbojet engine nacelle according to claim 1, wherein the nacelle is a O-duct type nacelle.

* * * * *